United States Patent [19]

Strachan

[11] 3,843,621

[45] Oct. 22, 1974

[54] PROCESS FOR PREPARING LEUCYL-LEUCYL-VALYL-PHENYLALANYL METHYL ESTER

[75] Inventor: Robert G. Strachan, North Plainfield, N.J.

[73] Assignee: Merck & CO. Inc., Rahway, N.J.

[22] Filed: Aug. 19, 1971

[21] Appl. No.: 173,278

[52] U.S. Cl. .......................................... 260/112.5
[51] Int. Cl. ..................... C07c 103/52, C07g 7/00
[58] Field of Search ................................. 260/112.5

[56] References Cited
UNITED STATES PATENTS
3,700,651  1/1972  Yamamura et al. ............. 260/112.5

OTHER PUBLICATIONS

Mizoguchi et al., Chem. Pharm. Bull., 18, 1465 (1970).
Bodanszky, M. and Ondetti, M., "Peptide Synthesis," Interscience, New York (1966), p. 93–95.
Fieser, L. F. and Fieser, M., "Advanced Organic Chemistry," Reinhold Pub. Co., New York, (1961), p. 384.
L. Fieser and M. Fieser, "Reagents for Organic Synthesis," Vol. I, Wiley & Sons, N.Y. (1967), p. 1160.

*Primary Examiner*—Elbert L. Roberts
*Assistant Examiner*—Reginald J. Suyat

[57] ABSTRACT

The invention disclosed herein relates to the methyl ester of leucyl-leucyl-valyl-phenylalanine, and salts thereof, and to the process of preparing these peptide compounds by reacting phenylalanine with the N-carboxyanhydride of valine to form valyl-phenylalanine, reacting the latter with the N-carboxyanhydride of leucine to form the tripeptide, leucyl-valyl-phenylalanine, reacting this tripeptide with the N-carboxyanhydride of leucine to form leucyl-leucyl-valyl-phenylalanine, and reacting this tetrapeptide with methanol in the presence of an esterifying agent such as thionyl halide. The leucyl-leucyl-valyl-phenylalanine methyl ester compounds thus obtained are active as renin inhibitors, and are thus of value as anti-hypertensive agents.

2 Claims, No Drawings

PROCESS FOR PREPARING LEUCYL-LEUCYL-VALYL-PHENYLALANYL METHYL ESTER

This invention is concerned generally with novel tetrapeptides esters, salts thereof, and processes for their preparation. More particularly, it relates to the methyl ester of leucyl-leucyl-valyl-phenylalanine and hydrochloride salts thereof; and to the process of preparing this tetrapeptide methyl ester by sequentially reacting (1) phenylalanine with the N-carboxyanhydride of valine; (2) valyl-phenylalanine with the N-carboxyanhydride of leucine; (3) leucyl-valyl-phenylalanine with the N-carboxyanhydride of leucine; and reacting the thus formed leucyl-leucyl-valyl-phenylalanine with a methylating agent. This leucyl-leucyl-valyl-phenylalanine methyl ester has potent renin inhibiting activity, and is a valuable anti-hypertensive agent.

In accordance with the present invention, phenylalanine is reacted with the N-carboxyanhydride of valine, which reaction is conducted by bringing the reactants together in aqueous solution with vigorous agitation at pH 10.2, under which conditions the reaction is ordinarily complete in about two minutes. The alkaline reaction solution is acidified, thereby decomposing the intermediate carbamate to form a solution of valyl-phenylalanine which, after adjusting the pH to 10.2, is reacted with vigorous agitation with the N-carboxyanhydride of leucine. The reaction solution is acidified, thereby decomposing the intermediate carbamate to form a solution of leucyl-valyl-phenylalanine which, after adjusting the pH to 10.2, is then reacted with vigorous agitation with additional leucine N-carboxyanhydride. The reaction solution is acidified to pH 3.0, thereby decomposing intermediate carbamate, and the material which precipitates is recovered by filtration, washed with boiling water and dried to give substantially pure leucyl-leucyl-valyl-phenylalanine.

The esterification of the free carboxyl of the leucyl-leucyl-valyl-phenylalanine is conveniently conducted by adding the latter to a cold (temperature approximately 0°C) methanol solution of a thionyl halide, such as thionyl chloride, thionyl bromide, and the like, and then heating the resulting mixture at approximately reflux temperature for a period of about 15–20 minutes, at the end of which time the esterification reaction is ordinarily substantially complete. The methyl ester product is conveniently recovered by cooling the reaction solution to about room temperature, evaporating the solvent *in vacuo*, and crystallizing the residual material from an organic solvent such as a mixture of a methanol and ether, thereby obtaining leucyl-leucyl-valyl-phenylalanine methyl ester hydrochloride or leucyl-leucyl-valyl-phenylalanine methyl ester hydrobromide in substantially pure form.

The following examples illustrate methods of carrying out the present invention, but it is to be understood that these examples are given for purposes of illustration and not of limitation.

EXAMPLE 1

About 330 mg. of phenylalanine is dissolved in 20 ml. of 1 molar aqueous potassium borate buffer having a pH=10.2*, about 300 mg. of the N-carboxy anhydride of valine is added, and the mixture is vigorously agitated (preferably using a Waring blender) for a period of two minutes while maintaining the temperature at 0°C. and the pH at 10.2 by the dropwise addition of aqueous potassium hydroxide solution. At the end of the 2 minute reaction period, sufficient concentrated sulfuric acid is added to bring the pH of the reaction mixture to 3.0, and a current of nitrogen is passed through the mixture for about 15 minutes, thereby sweeping carbon dioxide from said mixture.

*This buffer is conveniently prepared as follows: 1 mole of boric acid is slurried in 500 ml. of water, and solid potassium hydroxide merely sufficient to dissolve the boric acid is added; additional potassium hydroxide is then added to bring the pH to 10.2, the solution is diluted to 990 ml., the pH is again adjusted to 10.2, and the solution diluted to a final volume of 1,000 ml.

The pH of the resulting solution of valyl-phenylalanine is adjusted to 10.2 by the addition of aqueous potassium hydroxide solution, 333 mg. of the N-carboxy anhydride of leucine is added, and the mixture is vigorously agitated for a period of 2 minutes while maintaining the temperature at 0°C. and the pH at 10.2. At the end of the 2 minute reaction period, sufficient concentrated sulfuric acid is added to bring the pH of the reaction mixture to 2.5 (some solid material precipitates at this point), and a current of nitrogen is passed through the mixture for a period of about 15 minutes, thereby sweeping carbon dioxide from said mixture.

The pH of the resulting mixture containing leucyl-valyl-phenylalanine is then adjusted to 10.2 by the addition of aqueous potassium hydroxide solution, (whereupon the solid material, which precipitated during the previous acidification, redissolves), 336 mg. of the N-carboxy anhydride of leucine is added, and the resulting mixture is vigorously agitated for a period of two minutes while maintaining the temperature at 0°C. and the pH at 10.2. At the end of the 2 minute reaction period, concentrated sulfuric acid is added to adjust the pH of the reaction mixture to 3.0, and the material which precipitates is recovered by filtration, washed with boiling water, and dried to give substantially pure leucyl-leucyl-valyl-phenylalanine.

EXAMPLE 2

About 9.6 ml. of methanol is cooled to about −5°C., and 0.4 ml. of thionyl chloride is added dropwise, with stirring, while maintaining the temperature of the mixture below about 0°C. About 3 ml. of the resulting mixture is warmed to room temperature, 100 mg. of leucyl-leucyl-valyl-phenylalanine is added, and the resulting mixture is heated under reflux for a period of about 15 minutes. The reaction mixture is cooled to room temperature, and the solvent is evaporated *in vacuo*. The residual material is dissolved in methanol, ether is added to the solution, and the material which precipitates is recovered by filtration to give, in substantially pure form, the methyl ester of leucyl-leucyl-valyl-phenylalanine hydrochloride.

Various changes and modifications may be made in carrying out the present invention without departing from the spirit and scope thereof. Insofar as these changes and modifications are within the purview of the annexed claims, they are to be considered as part of this invention.

What is claimed is:

1. The process of preparing the methyl ester of leucyl-leucyl-valyl-phenylalanine and hydrohalide salts thereof, which comprises sequentially reacting (1) phenylalanine with the N-carboxyanhydride of valine to form valyl-phenylalanine; (2) valyl-phenylalanine with the N-carboxyanhydride of leucine to form leucylvalyl-phenylalanine; (3) the latter tripeptide with the N-carboxyanhydride of leucine to form leucyl-leucyl-valyl-phenylalanine, each of which sequential reactions is conducted without isolation of intermediate di- and tri-peptides (a) by bringing the reactants together in aqueous buffered solution, with vigorous agitation, while maintaining the pH at 10.2 and the temperature at 0°C, and (b) by then adjusting the pH of the reaction mixture to about 2.5-3.0 thereby decomposing carbamate to form the free amino grouping; and reacting said leucyl-leucyl-valyl-phenylalanine with methanol in the presence of thionyl halide to form the methyl ester of leucyl-leucyl-valyl-phenylalanine hydrohalide.

2. The process as defined in claim 1 in which the leucyl-leucyl-valyl-phenylalanine formed by the reaction of leucyl-valyl-phenylalanine with leucine N-carboxyanhydride is recovered from the acidified reaction mixture.

* * * * *